United States Patent
Lee

(10) Patent No.: US 9,793,823 B2
(45) Date of Patent: Oct. 17, 2017

(54) CONTROLLER FOR GRID TIED INVERTER SYSTEM

(71) Applicant: LSIS CO., LTD, Anyang-si, Gyeonggi-do (KR)

(72) Inventor: Ki Su Lee, Anyang-si (KR)

(73) Assignee: LSIS CO., LTD, Anyang-si (KR)

(*) Notice: Subject to any disclaimer, the term of this patent is extended or adjusted under 35 U.S.C. 154(b) by 16 days.

(21) Appl. No.: 14/679,955

(22) Filed: Apr. 6, 2015

(65) Prior Publication Data

US 2015/0303827 A1 Oct. 22, 2015

(30) Foreign Application Priority Data

Apr. 16, 2014 (KR) .................. 10-2014-0045297

(51) Int. Cl.
*H02M 7/537* (2006.01)
*H02M 3/156* (2006.01)
*H02M 7/48* (2007.01)
*H02M 1/00* (2006.01)

(52) U.S. Cl.
CPC .......... *H02M 7/537* (2013.01); *H02M 3/156* (2013.01); *H02M 7/4807* (2013.01); *H02M 2001/007* (2013.01)

(58) Field of Classification Search
CPC .... H02M 7/537; H02M 7/4807; H02M 3/156; H02M 2001/007; H02M 1/143; H02J 3/18; H02J 3/385; H02J 2001/004; H02J 3/383; H02J 3/386; H02J 3/387; H01M 16/003;

(Continued)

(56) References Cited

U.S. PATENT DOCUMENTS 8,531,855 B2 * 9/2013 Lee ........................... G05F 1/67
 323/906
8,547,716 B2 * 10/2013 Yoneda ................. H01M 10/02
 323/906

(Continued)

FOREIGN PATENT DOCUMENTS

CN 103097974 5/2013
EP 2530818 12/2012

(Continued)

OTHER PUBLICATIONS

European Patent Office Application Serial No. 15162753.6, Search Report dated Nov. 26, 2015, 10 pages.

(Continued)

*Primary Examiner* — Fred E Finch, III
*Assistant Examiner* — Demetries A Gibson
(74) *Attorney, Agent, or Firm* — Lee, Hong, Degerman, Kang & Waimey PC

(57) ABSTRACT

The present invention relates to a controller for a grid tied inverter system with an improved control configuration for increasing response speed of an output current according to specific electric power required. The controller comprises a first control circuit section to output a direct current (DC)-DC converter control signal, and a second control circuit section to output an inverter control signal, wherein the first control circuit section and the second control circuit section are independent of each other without a link for signal input and output therebetween.

4 Claims, 4 Drawing Sheets

(58) Field of Classification Search
CPC ..... H02S 10/10; Y02E 10/563; Y02E 10/763; Y10T 307/658
See application file for complete search history.

(56) References Cited

U.S. PATENT DOCUMENTS

| | | | | |
|---|---|---|---|---|
| 8,674,668 | B2* | 3/2014 | Chisenga | H02M 3/156 323/266 |
| 8,767,421 | B2* | 7/2014 | Chapman | H02J 3/383 363/131 |
| 2007/0296357 | A1* | 12/2007 | Song | H02P 23/07 318/139 |
| 2010/0057267 | A1* | 3/2010 | Liu | H02J 3/18 700/297 |
| 2010/0142236 | A1 | 6/2010 | Lee et al. | |
| 2010/0156186 | A1* | 6/2010 | Kim | H01M 16/003 307/72 |
| 2010/0157638 | A1* | 6/2010 | Naiknaware | H02M 7/4807 363/131 |
| 2012/0134191 | A1 | 5/2012 | Yoneda | |
| 2013/0058134 | A1* | 3/2013 | Yamada | H02M 7/217 363/17 |
| 2014/0268943 | A1* | 9/2014 | Phadke | H02H 7/1222 363/55 |
| 2014/0369090 | A1* | 12/2014 | Ueki | H02M 1/15 363/41 |

FOREIGN PATENT DOCUMENTS

| | | |
|---|---|---|
| JP | 06332554 | 12/1994 |
| JP | 2000-020150 | 1/2000 |
| JP | 2002-112459 | 4/2002 |
| KR | 20100065914 | 6/2010 |
| WO | 2011090210 | 7/2011 |
| WO | 2012/026593 | 3/2012 |
| WO | 2013051152 | 4/2013 |
| WO | 2013/146340 | 10/2013 |

OTHER PUBLICATIONS

Japan Patent Office Application Serial No. 2015-084263, Office Action dated Jan. 19, 2016, 3 pages.
Japan Patent Office Application No. 2015-084263, Office Action dated Sep. 6, 2016, 2 pages.
State Intellectual Property Office of the People's Republic of China Application Serial No. 201510233833.7, Office Action dated Feb. 27, 2017, 6 pages.
Korean Intellectual Property Office Application No. 10-2014-0045297, Office Action dated Mar. 31, 2017, 6 pages.

* cited by examiner

CONTROLLER FOR GRID TIED INVERTER SYSTEM

CROSS-REFERENCE TO RELATED APPLICATIONS

Pursuant to 35 U.S.C. §119(a), this application claims the benefit of earlier filing date and right of priority to Korean Application No. 10-2014-0045297, filed on Apr. 16, 2014, the contents of which are all hereby incorporated by reference herein in its entirety.

BACKGROUND OF THE DISCLOSURE

1. Field of the Disclosure

This specification relates to an inverter system for supplying direct current (abbreviated as "DC" hereinafter) electric power from a DC power supply source to a commercial alternating current (abbreviated as "AC" hereinafter) grid, and more particularly, a controller for a grid tied inverter system with an improved sequential control configuration (hereinafter, referred to as a control configuration) so as to immediately supply electric power required by the commercial AC grid.

2. Background of the Disclosure

A DC voltage which is generated by various DC energy supply sources such as photovoltaic energy, wind energy, fuel cells and the like for supply is inverted into an AC voltage, which is equal a grid voltage, by an inverter system so as to be supplied to grids.

The related art inverter system includes a DC-DC converter connected to an output of the DC energy supply source, and an inverter connected to an output of the DC-DC converter, to control an output current on the basis of a command value generated by a controller.

Also, the related art inverter system adjusts an input voltage command by applying a maximum power point tracking (can be abbreviated as "MPPT") algorithm, so as to provide maximum electric power according to variation of grid loads.

In recent time, with the rise of the necessity to protect grids and limit a quantity of electric power generated and the establishment of related regulations, a technology of controlling electric power generated by the DC energy supply source below maximum electric power is required.

Since the controller of the related art inverter system outputs an inverter control signal using a DC link voltage, which is generated by outputting a control signal of the DC-DC converter, a plurality of control circuit sections are linked to one another to input and output signals, starting from an input voltage to an output current. Accordingly, the controller for the related art inverter system has a configuration that the plurality of control circuit sections have a unified configuration as one.

Therefore, to control electric power, required power should be found (or determined) through repetition of controlling an input voltage command, sequentially operating the plurality of control circuit sections, and finally providing an output current.

However, the related art control method has several problems of increasing a required processing time due to a complicated control configuration, and failing to immediately provide an output current corresponding to specific electric power due to a slow response time (or a low response speed).

Various prior technologies including Korean granted Patent No. 10-1032720 are searched for in relation to the grid tied inverter system, but there is not any technology associated with the technical task which is considered in the present invention.

SUMMARY OF THE DISCLOSURE

Therefore, an object of the present invention is to provide a controller for a grid tied inverter system having an improved control configuration to realize an immediate control for specific electric power.

The object can be achieved by providing a controller for a grid tied inverter system according to the present invention, the inverter system comprising a direct current (abbreviated as "DC")-DC converter connected to an output of a DC energy supply source, and an inverter connected to an output of the DC-DC converter, to invert a DC voltage applied from the DC energy supply source into an alternating current (abbreviated as "AC") grid voltage and supply the inverted AC grid voltage to a grid, the controller comprising:

a first control circuit section configured to output a DC-DC converter control signal for controlling the DC-DC converter; and a second control circuit section configured to output an inverter control signal for controlling the inverter, wherein the first control circuit section and the second control circuit section are independent of each other due to a non-link of signal input and output therebetween, wherein the second control circuit section comprises:

an input voltage control circuit section configured to control an input voltage by an input voltage command to output an output current command; and an output current control circuit section configured to control an output current by the output current command, output by the input voltage control circuit section, to output the inverter control signal.

In accordance with one aspect of the present invention, the first control circuit section comprises a DC link voltage control circuit section configured to control a DC link voltage by a DC link voltage command to output an input current command; and an input current control circuit section configured to control an input current by the input current command to output the DC-DC converter control signal.

In accordance with another aspect of the present invention, the first control circuit section is configured to control a DC link voltage by a DC link voltage command to output the DC-DC converter control signal.

In accordance with still another aspect of the present invention, the second control circuit section is configured to control an output current by an output current command, set according to desired electric power, to output the inverter control signal.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of technical features of the present invention, with command to the accompanying drawings.

Figure 1:
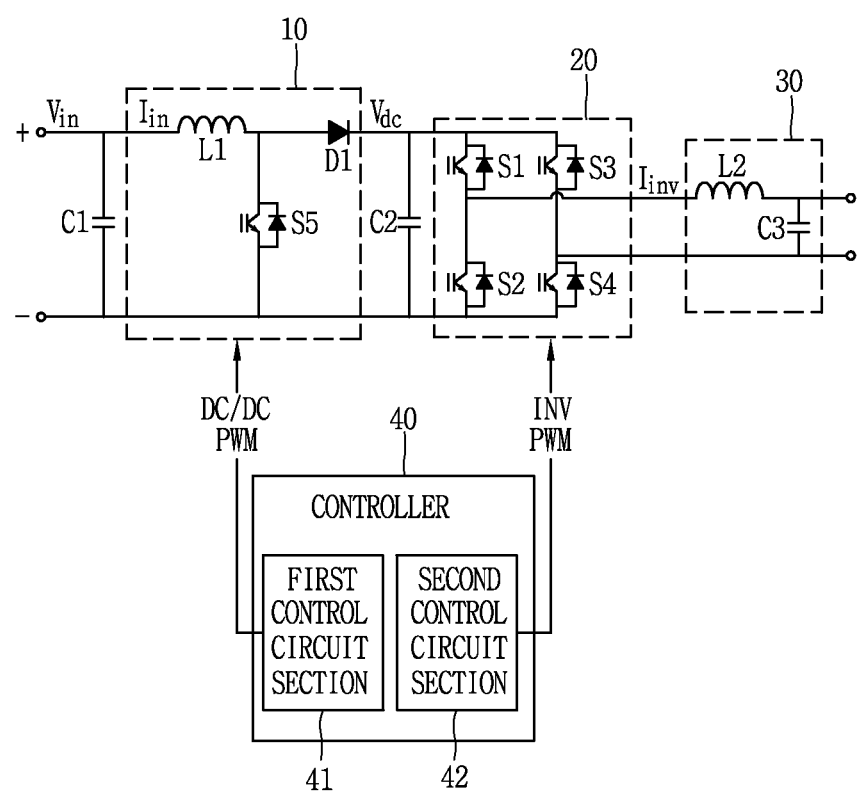
FIG. 1 is a block diagram of an inverter system and a controller for the inverter system in accordance with a preferred embodiment of the present invention.

FIG. 1 is a block diagram of an inverter system in accordance with a preferred embodiment of the present invention. An inverter system according to the present invention comprises a DC-DC converter 10, an inverter 20, a filter unit 30, and a controller 40.

The DC-DC converter 10 is a component which stabilizes DC voltages generated by various types of DC energy supply sources and boosts or converts the stabilized DC voltages into appropriate levels of voltages. FIG. 1 exemplarily illustrates a boost converter, but the DC-DC converter 10 which can be included in the inverter system according to the present invention is not limited to this.

With regard to the DC-DC converter 10 of FIG. 1, when a switching element S5 is conducted (turned on) in response to a DC-DC converter pulse width modulation (abbreviated as "PWM" hereinafter) control signal DC-DC PWM provided by the controller 40, electric energy according to an input current Iin is stored in a reactor L1. When the switching element S5 is turned off, the electric power source stored in the reactor L1 is provided to a condenser C2, thereby generating a DC link voltage Vdc which is a constant voltage.

The inverter 20 is connected to an output of the DC-DC converter 10 and inverts the DC link voltage Vdc, which is output from the DC-DC converter 10, into an AC voltage which is equal to a grid voltage, by switching operations of switching elements S1 to S4 in accordance with an inverter PWM control signal (INV PWM) provided by the controller 40.

The filter unit 30 is a circuit for removing harmonic components mixed with the AC electric source inverted by the inverter 20. The filter unit 30 comprises a reactor L2 and a condenser C3.

The controller 40 comprises a first control circuit section 41 and a second control circuit section 42, so as to output to the corresponding control circuit sections an input voltage command Vin ref, an input current command Iin ref, a DC link voltage command Vdc ref and an output current command Iinv ref for controlling an input voltage Vin applied to the condenser C1, the input current Iin flowing along the reactor L1, the DC link voltage Vdc applied to the condenser C2, and the output current Iinv flowing along the reactor L2, respectively. The controller 40 outputs the DC-DC converter PWM control signal DC-DC PWM and the inverter PWM control signal INV PWM for controlling the operations of the DC-DC converter 10 and the inverter 20, respectively.

The controller 40 generally generates such various control signals according to a maximum power point tracking (MPPT) algorithm such that the inverter system according to the present invention can produce maximum electric power from a specific voltage and a specific current according to grid load variation. Also, the controller 40 continuously changes a command value for searching for a maximum electric power point, such that output electric power of the inverter system according to the present invention can track the maximum electric power point.

The first control circuit section 41 is configured to output the DC-DC converter PWM control signal DC-DC PWM. The second control circuit section 42 is configured to output the inverter PWM control signal INV PWM.

Figure 2:
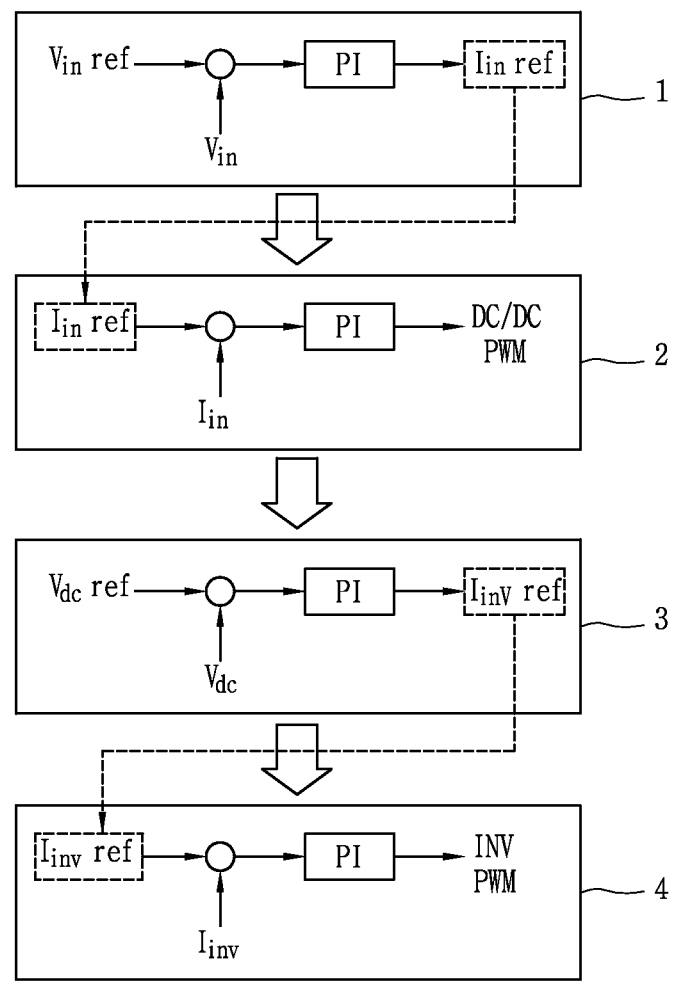
FIG. 2 is a block diagram illustrating a control configuration of a controller for an inverter system according to a related art.

In view of a control configuration of a controller for an inverter system according to a related art, as illustrated in FIG. 2, an input voltage control circuit section 1, an input current control circuit section 2, a DC link voltage control circuit section 3 and an output current control circuit section 4 are linked to one another such that signals can be input and output therebetween.

That is, the input voltage control circuit section 1 controls an input voltage Vin by the input voltage command Vin ref to output an input current command Iin ref. The input current control circuit section 2 controls an input current Iin by the input current command Iin ref to output a DC-DC converter PWM control signal DC-DC PWM, thereby controlling the DC-DC converter 10.

When the DC link voltage Vdc is generated by controlling the DC-DC converter 10, the DC link voltage control circuit section 3 controls the DC link voltage Vdc by the DC link voltage command Vdc ref, thereby outputting an output current command Iinv ref of the inverter 20.

The output current control circuit section 4 controls the output current Iinv by the output current command Iinv ref to output the inverter PWM control signal INV PWM, thereby controlling operation of the inverter 20.

That is, the related art controller for the inverter has a sequential configuration of operating the DC-DC converter 10 in a manner that the input voltage control circuit section 1 generates the input current command Iin ref to track (or control) the input voltage Vin, and the input current control circuit section 2 operates and generates the DC-DC converter PWM control signal DC-DC PWM for the flow of a desired input current.

The DC link voltage Vdc varies according to an operating state of the DC-DC converter 10. The DC link voltage control circuit section 3 outputs the output current command Iinv ref to maintain a desired DC link voltage Vdc. The output current control circuit section 4 operates and generates the inverter PWM control signal INV PWM for the flow of a desired output current Iinv, thereby operating the inverter 20.

In such a manner, the controller for the inverter system according to the prior art has the configuration that the plurality of control circuit sections are unified with one another. This causes increases in interdependence among the control circuit sections and a slow response time of the output current Iinv.

The responding process will be explained in detail. The output current command Iinv ref of the output current control circuit section 4 has to change in order to change the output current Iinv. To this end, an output of the DC link voltage control circuit section 3 has to change.

However, since the DC link voltage Vdc has to be uniformly maintained, an input of the input current control circuit section 2 has to change. To this end, an output of the input current control circuit section 2 has to change. Also, an input of the input voltage control circuit section 1 has to change in order to change an output of the input voltage control circuit section 1.

Therefore, in order to change the output current Iinv, the input of the frontmost input voltage control circuit section 1 in the sequential control configuration has to change, such that the plurality of control circuit sections can react in a sequential manner to obtain a desired control result.

In FIG. 2, the control used in each control circuit section is exemplarily illustrated as a proportional integral (can be abbreviated as PI hereinafter) control, but the present invention is not limited to the PI control. Other conventional control methods such as a Proportional Control, a Proportional Integral and Differential (can be abbreviated as PID) control and the like can also be applied to the present invention.

The present invention roughly divides the related art configuration, in which the plurality of control circuit sections actually operate as an unified sequential configuration due to the linked structure among them, into two parts, namely, a first control circuit section 41 and a second control circuit section 42, so as to remove the interdependence and obtain a fast response speed for an output current control.

The first control circuit section 41 and the second control circuit section 42 have configurations independent of each other. The DC-DC converter 10 operates in response to the DC-DC converter PWM control signal DC-DC PWM which is output from the first control circuit 41, but the operation of the DC-DC converter 10 does not affect an input signal of the second control circuit section 42. The second control circuit section 42, irrespective of the first control circuit section 41, generates the input voltage command Vin ref and/or the output current command Iinv ref, and outputs the inverter PWM control signal INV PWM as an output signal.

This indicates that the DC-DC converter 10 is free from the control for the inverter. This allows the DC link voltage Vdc to be constant on the inverter system circuit and also enables a fast immediate control for the output current Iinv.

Figure 3:
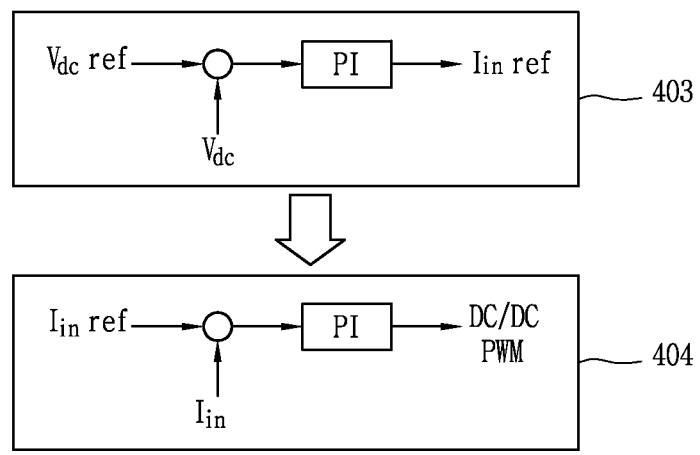
FIG. 3 is a block diagram illustrating a configuration of a first control circuit section of a controller in accordance with a preferred embodiment of the present invention.

FIG. 3 is a block diagram illustrating an independent configuration of the first control circuit section. As illustrated in FIG. 3, an output of a DC link voltage control circuit section 403 for controlling a DC link voltage Vdc is converted into an input current command Iin ref. Upon reception of the input current command Iin ref, an input current control circuit section 404 controls the DC-DC converter 10 accordingly. Therefore, the first control circuit section 41 constantly maintains the DC link voltage Vdc in the circuit of FIG. 1, but is separated from an input/output link with the second control circuit section 42 so as to operate independent of the second control circuit section 42.

Figure 4:
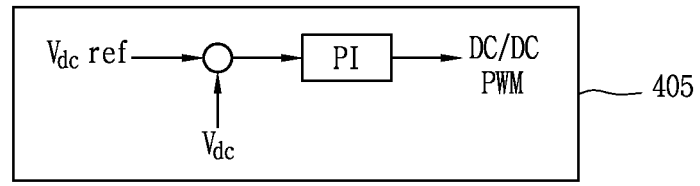
FIG. 4 is a block diagram illustrating another configuration of the first control circuit section of the controller in accordance with another preferred embodiment of the present invention.

FIG. 4 is a block diagram illustrating another exemplary embodiment of the configuration of the first control circuit section 41. FIG. 4 illustrates a configuration that the input current control circuit section 404 is removed and thus the DC link voltage control circuit section 403 can directly control the DC-DC converter 10.

Figure 5:
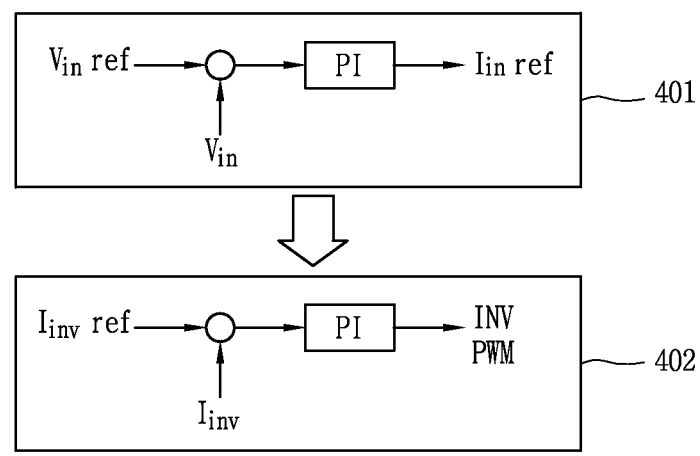
FIG. 5 is a block diagram illustrating a configuration of a second control circuit section of the controller in accordance with a preferred embodiment of the present invention.

FIG. 5 is a block diagram illustrating a configuration of the second control circuit section 42, which illustrates a configuration that an output of an input voltage control circuit section 401 is directly connected to an output current control circuit section 402 such that an output signal of the output current control circuit section 402 is a control signal for the inverter 20. Hence, since the sequential control configuration is changed from the four-stage control according to the related art illustrated in FIG. 2 into the two-stage control according to the present invention, a response time for outputting the output current Iinv can be remarkably reduced as compared with the related art.

Under a situation of requiring for power lower than a maximum electric power point, in order to allow for an immediate control of the output current Iinv, only the output current control circuit section 402 can independently operate by disconnecting the link between the input voltage control circuit section 401 and the output current control circuit section 402, so as to change the input voltage Vin by the control of the output current Iinv.

In other words, because of P (electric power)=V (voltage)×I (current), when the output current Iinv is controlled, desired electric power can be immediately controlled. Accordingly, when operating the output current control circuit section 402 by setting the output current command Iinv ref according to electric power required, a desired output current Iinv can immediately be obtained, irrespective of an output signal of the input voltage control circuit section 401.

In this manner, the present invention has the technical feature in that the controller for the inverter system is configured by dividing into the first control circuit section 41 and the second control circuit section 42 so as to derive a fast reaction with respect to a desired electric power level and thus maximize response speed, and to provide a detailed control configuration therefor.

As described above, in the present invention, since the sequential control configuration of the controller for the inverter system in which the control circuit sections are linked into an integral form has been improved in a dividing manner, a direct control for an output current can be achieved, and an output current corresponding to desired electric power can immediately be provided.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A controller for a grid tied inverter system, the inverter system comprising a direct current (DC) DC-DC converter connected to an output of a DC energy supply source, and an inverter connected to an output of the DC-DC converter and configured to invert a DC voltage applied from the DC energy supply source into an alternating current (AC) grid voltage and supply the inverted AC grid voltage to a grid, the controller comprising:

a first control circuit section configured to output a DC-DC converter control signal for controlling the DC-DC converter; and a second control circuit section configured to output an inverter control signal for controlling the inverter, wherein the first control circuit section and the second control circuit section are independent of each other due to a non-link of signal input and output therebetween, wherein the second control circuit section comprises:
an input voltage control circuit section configured to generate an output current command by proportional integrating a difference between an input voltage command from the input voltage control circuit section and an input voltage from the DC energy source; and
an output current control circuit section configured to generate the inverter control signal based only on proportional integrating a difference between the output current command and an input current from the DC energy source and to output the generated inverter control signal directly to the inverter.

2. The controller of claim 1, wherein the first control circuit section comprises:
a DC link voltage control circuit section configured to generate an input current command by proportional integrating a difference between a DC link voltage command from the DC link voltage control circuit section and a DC link voltage from a DC link condenser; and
an input current control circuit section configured to generate the DC-DC converter control signal by proportional integrating a difference between the input current command from the input current control circuit section and an input current from the DC energy source.

3. The controller of claim 1, wherein the first control circuit section is configured to generate the DC-DC converter control signal by proportional integrating a difference between a DC link voltage command from the first control circuit section and a DC link voltage from a DC link condenser.

4. The controller of claim 1, wherein the second control circuit section is configured to control an output current by the output current command, set according to desired electric power, to output the inverter control signal.

* * * * *